Patented Apr. 22, 1952

2,594,030

UNITED STATES PATENT OFFICE 2,594,030

PROCESS FOR PRODUCING ALPHA-MERCAPTO-CARBOXYLIC ACIDS

Robert J. Coons, Chicago, and Casper A. Todaro, Mount Prospect, Ill., assignors to Gillette Safety Razor Company, Boston, Mass., a corporation of Delaware No Drawing. Application March 28, 1950,
Serial No. 152,515

8 Claims. (Cl. 260—526)

Our invention relates to a practical and economical process for the production of alpha-mercapto-carboxylic acids and congenious organic substances derivable from the acids. In its most particular aspect the invention concerns the production of thioglycollic acid which is useful, for example, in the manufacture of hair-waving preparations.

Methods heretofore proposed for the production of thioglycollic acid are not generally suited for commercial scale operation, primarily because of the poor yields they afford and the length of the reaction periods required. While a yield of 85% is claimed in one instance, in actual practice it has been found that the yield is invariably substantially less than this, even though the process conditions are most carefully controlled to maintain them within the limits indicated as critical by the proponent of the method.

Proceeding in accordance with our invention, the yield of the acid is seldom less than 90% of theory, and yields of the order of 95% are common. Moreover, the amount of labor and equipment demanded are less, and markedly less time is required in carrying out the necessary reactions.

Generally described, our process as applied in the preferred manner to the production of thioglycollic acid involves five principal steps as follows:

(a) Formation of a Bunte salt by reaction of an alkali metal mono-haloacetate, as sodium or potassium mono-chloroacetate, with an alkali metal thiosulphate, normally sodium thiosulphate because of its ready availability and low cost.

(b) Hydrolysis of the Bunte salt with sulphuric acid.

(c) Conversion of the dithiodiglycollic acid content of the hydrolysis product to thioglycollic acid.

(d) Extraction of the thioglycollic acid with a suitable organic solvent.

(e) Recovery of the thioglycollic acid from the extract.

In an alternative procedure within the scope of our invention steps (c) and (d) are reversed, i. e., the dithioglycollic acid formed incident to the hydrolysis, which yields thioglycollic acid predominantly, is reduced to thioglycollic acid following extraction of the hydrolysis product with a solvent capable of extracting both acids.

The thioglycollic acid may be recovered as such from the extract [step (e)] by physical means, e. g., fractionation under reduced pressure, or it may be recovered in the form of a compound insoluble in the solvent or preferentially soluble in water. Ordinarily, we carry out the extraction using butyl or isopropyl ether as the solvent and recover the acid from the extract by "salting" it out with aqueous ammonia. This provides an aqueous solution of ammonium thioglycollate which we normally apply directly in the manufacture of a hair-waving preparation. The corresponding sodium and potassium salts, for example, may be obtained, when desired, by adding aqueous sodium or potassium hydroxide to the extract.

The high yields which distinguish our process are a result of careful control of the concentration of the sulphuric acid in the hydrolysis stage. Whereas the reports of prior workers attach no criticality to the sulphuric acid concentration, we have found it essential to employ the acid in an amount assuring a concentration at the point of completion of the hydrolysis reaction of 25–40%. As a matter of practice we generally so carry out the process that the acid concentration at such point is within the range 30–35%.

Alpha-mercapto-acids other than thioglycollic acid which may be prepared by our process include, for example, thiolactic acid and acids comprising a phenyl group, as phenyl thioglycollic and phenyl thiolactic acids. Applying the process to the manufacture of thiolactic acid, sodium alpha-mono-chloropropionate or other suitable alkali metal alpha-mono-halopropionate is used in lieu of an alkali metal mono-haloacetate. Where phenyl thioglycollic acid is desired, sodium phenyl mono-chloroacetate or sodium phenyl mono-bromoacetate, for example, is reacted with the thiosulphate to produce the Bunte salt.

Many other derivatives of thioglycollic acid in addition to the salts previously mentioned can be produced according to the invention either by simple extensions of the basic procedures described or by slightly modifying these procedures. Thus, esters can be prepared by adding alcohols to the mixture following the hydrolysis. The ester products are as readily extractible as the acids themselves.

Our process, in that it demands the use in the initial reaction of a salt of an alpha-monohalocarboxylic acid rather than the acid itself, completely avoids the problem of elemental sulphur formation so much concerning the prior workers.

The detailed practice of our invention will be readily understood from the following examples which are not to be taken as in any way limiting the scope of the invention.

EXAMPLE I

Step 1.—Bunte salt formation 1340 pounds of technical grade sodium chloracetate (80%) are placed in a 500 gallon glass-lined tank, 165 gallons of water are added, and the mass is heated to 50° C. with agitation. When solution is complete, 2275 pounds of technical sodium thiosulphate are added in crystalline form in as short a time period as possible. The temperature will drop somewhat and heat must be applied to attain a temperature of 70–75° C., which must be maintained for at least one hour. The volume at this point is about 450 gallons and a suspension of sodium chloride will be noticed.

Step 2.—Hydrolysis of Bunte salt 437 gallons of 70% $H_2SO_4$ are placed in a 1000 gallon glass-lined tank and cooled to 35° C. The Bunte salt ($NaOOCCH_2SSO_3Na$) is rapidly pumped into the acid, while the acid is constantly agitated. The temperature will rise somewhat and care must be exercised so as not to exceed 85° C. After about 2 hours at 80–85° C hydrolysis is complete. The solution, containing from 30–35% sulphuric acid, is then cooled to 20–25° C. in preparation for the next step. Volume approximately 875 gallons.

Step 3.—Reduction

To the cooled solution, 310 pounds of zinc dust are slowly added over a period of 20–40 minutes with agitation. The temperature tends to rise and cooling is necessary. After addition of the zinc is complete, the temperature is slowly increased to 50° C. to insure completeness of reaction, whereafter the mixture is again cooled to 25° C. A sample is checked at this point for dithio-content. The ratio of dithio- to thio- should be less than 1:25 (4% dithio-). Volume will be approximately 900 gallons, equivalent to 835 pounds thioglycollic acid, representing a yield of 95% of theoretical. A large quantity of $NaHSO_4$ crystals are contained in suspension. The material is pumped to the extractors or to storage tanks, if intermediate storage is indicated.

Step 4.—Extraction

The zinc-reduced acid liquor is extracted with butyl or isopropyl ether or other suitable solvent by batch or continuous countercurrent methods to remove the thioglycollic acid from its mother liquor. Following the usual procedure, 200 gallons of the cooled acid liquor are charged to a 600-gallon acid-resistant vessel provided with agitating means and having a side outlet located at the 200-gallon level. 300 gallons of dibutyl ether are introduced into the vessel and the contents agitated for about 15 minutes. After 10 minutes' settling, the ether layer is run out the side outlet into a second vessel. By repeating the extraction and settling four times with fresh ether, approximately 93% of the thioglycollic acid is recovered from the acid liquor.

Step 5.—Finishing step

Aqueous ammonia (29%) is mixed with the ether solution, care being exercised so that the pH of the mixture is not carried beyond 6.5. The resulting emulsion is allowed to settle for a period of about 10 minutes, whereafter the bottom aqueous layer consisting of a 50–58% solution of ammonium thioglycollate is withdrawn. The ether can be reused in the extraction of the acid liquor in Step 4.

EXAMPLE II

The principal reactions are carried out as described above under Steps 1 and 2. Thereafter the hydrolysis mixture is extracted with either of the ethers to separate both the thioglycollic and the dithiodiglycollic acids. Powdered zinc dust is added to the ether extract with constant agitation. The quantity of zinc used in this case is only one-half that used above (about 15% of the original weight of chloracetic acid). After the zinc dust addition, 10% sulphuric acid is slowly added in 3 equal aliquots over a period of approximately 45 minutes to maintain the mixture acid. In the absence of such addition the desired reduction does not take place or is incomplete. The volume of 10% sulphuric acid used is about 5% of the volume of ether solution reduced. Cooling may be necessary to keep the temperature well below the boiling point of the ether. The ether layer is then decanted off, and treated as in Step 5, supra.

Having thus described and illustrated our invention, what we claim is:

1. A process for producing a mercapto-carboxylic acid in which the mercapto-group is attached to an aliphatic carbon atom to which the carboxyl group is also attached, comprising reacting a salt of a corresponding alpha-halo-carboxylic acid and an alkali metal thiosulphate in an aqueous medium under conditions yielding a Bunte salt and hydrolyzing the Bunte salt with the aid of sulphuric acid, the concentration of the sulphuric acid in the hydrolysis mixture at the point of completion of the hydrolysis being within the range 25 to 40%.

2. A process for producing a mercapto-carboxylic acid in which the mercapto-group is attached to an aliphatic carbon atom to which the carboxyl group is also attached, comprising reacting an alkali metal salt of a corresponding alpha-halo carboxylic acid and an alkali metal thiosulphate in an aqueous medium under conditions yielding a Bunte salt, hydrolyzing the Bunte salt with the aid of sulphuric acid, employed in an amount assuring a sulphuric acid concentration at the point of completion of the hydrolysis reaction of 25 to 40%, converting any dithio-acid formed on the hydrolysis to alpha-mercapto acid and extracting the mixture to separate alpha-mercapto acid.

3. A process for producing a mercapto-carboxylic acid in which the mercapto-group is attached to an aliphatic carbon atom to which the carboxyl group is also attached, comprising reacting an alkali metal salt of a corresponding alpha-halo-carboxylic acid and an alkali metal thiosulphate in an aqueous medium under conditions yielding a Bunte salt, hydrolyzing the Bunte salt with the aid of sulphuric acid, employed in an amount assuring a sulphuric acid concentration at the point of completion of the hydrolysis reaction of 25 to 40%, extracting the mixture to remove alpha-mercapto and dithio-acid and treating the extract to convert the dithio-acid to alpha-mercapto acid.

4. Process for producing thioglycollic acid comprising reacting an alkali metal salt of mono-haloacetic acid and an alkali metal thiosulphate in an aqueous medium to obtain a Bunte salt and hydrolyzing the Bunte salt with the aid of sulphuric acid, the concentration of the sulphuric acid in the hydrolysis mixture at the point of completion of the hydrolysis being within the range 25 to 40%.

5. Process for producing thioglycollic acid comprising reacting sodium chloroacetate and sodium thiosulphate in an aqueous medium to obtain a Bunte salt, hydrolyzing the Bunte salt with the aid of sulphuric acid, employed in an amount assuring a sulphuric acid concentration at the point of completion of the hydrolysis reaction of 25 to 40%, converting any dithiodiglycollic acid formed on the hydrolysis to thioglycollic acid, extracting the mixture to separate thioglycollic acid and recovering the thioglycollic acid from the extract.

6. Process for producing thioglycollic acid comprising reacting sodium chloroacetate and sodium thiosulphate in an aqueous medium to obtain a Bunte salt, hydrolyzing the Bunte salt with the aid of sulphuric acid, employed in an amount assuring a sulphuric acid concentration at the point of completion of the hydrolysis reaction of 25 to 40%, extracting the mixture to remove thioglycollic acid and dithiodiglycollic acid, treating the extract to convert the dithiodiglycollic acid to thioglycollic acid and recovering the thioglycollic acid from the extract.

7. Process for producing thioglycollic acid comprising reacting sodium chloroacetate and sodium thiosulphate in an aqueous medium to obtain a Bunte salt, hydrolyzing the Bunte salt with the aid of sulphuric acid, employed in an amount assuring a sulphuric acid concentration at the point of completion of the hydrolysis reaction of 30 to 35%, converting any dithiodiglycollic acid formed on the hydrolysis to thioglycollic acid, extracting the mixture to separate thioglycollic acid and recovering the thioglycollic acid from the extract.

8. Process for producing thioglycollic acid comprising reacting sodium chloroacetate and sodium thiosulphate in an aqueous medium to obtain a Bunte salt, hydrolyzing the Bunte salt with the aid of sulphuric acid, employed in an amount assuring a sulphuric acid concentration at the point of completion of the hydrolysis reaction of 30 to 35%, extracting the mixture to remove thioglycollic acid and dithiodiglycollic acid, treating the extract to convert the dithiodiglycollic acid to thioglycollic acid and recovering the thioglycollic acid from the extract.

ROBERT J. COONS.
CASPER A. TODARO.

REFERENCES CITED

The following references are of record in the file of this patent:

UNITED STATES PATENTS

| Number | Name | Date |
| --- | --- | --- |
| 2,004,873 | Kirstahler et al. | June 11, 1935 |
| 2,012,073 | Schirm | Aug. 20, 1935 |
| 2,369,491 | Redmon et al. | Feb. 13, 1945 |
| 2,413,361 | Martin | Dec. 31, 1946 |

OTHER REFERENCES

Purgotti: Gazz. Chim. It., vol. 22I, pp. 416–426 (1892).